(12) United States Patent
Kambayashi

(10) Patent No.: US 11,505,067 B2
(45) Date of Patent: Nov. 22, 2022

(54) DISPLAY DEVICE AND METHOD OF INSTALLING DISPLAY DEVICE

(71) Applicant: JVCKENWOOD Corporation, Yokohama (JP)

(72) Inventor: Hideki Kambayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 20 days.

(21) Appl. No.: 16/917,993

(22) Filed: Jul. 1, 2020

(65) Prior Publication Data
US 2020/0331350 A1  Oct. 22, 2020

Related U.S. Application Data

(63) Continuation of application No. PCT/JP2018/037929, filed on Oct. 11, 2018.

(30) Foreign Application Priority Data

Jan. 10, 2018 (JP) .............................. JP2018-002086

(51) Int. Cl.
*B60K 35/00* (2006.01)
*G02B 27/01* (2006.01)

(52) U.S. Cl.
CPC .......... *B60K 35/00* (2013.01); *G02B 27/0101* (2013.01); *B60K 2370/1529* (2019.05); *B60K 2370/165* (2019.05); *G02B 2027/013* (2013.01)

(58) Field of Classification Search
CPC ............ B60K 35/00; B60K 2370/1529; B60K 2370/165; B60K 2370/23;
(Continued)

(56) References Cited

U.S. PATENT DOCUMENTS

2014/0368745 A1* 12/2014 Tohda .................... B60K 35/00
  348/745
2015/0103408 A1* 4/2015 Nishima ............ G02B 27/0101
  359/618
(Continued)

FOREIGN PATENT DOCUMENTS

JP  2014-119718   6/2014
JP  2015-191168   11/2015
(Continued)

OTHER PUBLICATIONS

International Search Report and Written Opinion for International Patent Application No. PCT/JP2018/037929 dated Jan. 8, 2019, 10 pages.

(Continued)

*Primary Examiner* — Brent D Castiaux
(74) *Attorney, Agent, or Firm* — Amin, Turocy & Watson, LLP

(57) ABSTRACT

A display device includes a display configured to display a video, a concave mirror configured to reflect a video display light of the video displayed on the display toward a reflection part that is formed in a curved shape and that faces a viewer, and a housing in which the display and the concave mirror are assembled, wherein an angle of the concave mirror with respect to the housing is adjustable by rotating the concave mirror on a reference plane of the housing in accordance with a relative positional relationship among the housing, the reflection part, and the viewer.

6 Claims, 15 Drawing Sheets

(58) Field of Classification Search
CPC .......... B60K 2370/334; B60K 2370/52; B60K 2370/66; B60K 2370/736; G02B 27/0101; G02B 27/0179; G02B 2027/1529
See application file for complete search history.

(56) References Cited

U.S. PATENT DOCUMENTS

2016/0320624 A1* 11/2016 Yamaoka ............... B60K 37/04
2017/0199449 A1 7/2017 Fujita et al.

FOREIGN PATENT DOCUMENTS

| JP | 2015191168 A | * 11/2015 |
|---|---|---|
| WO | 2016/047195 | 3/2016 |
| WO | 2016/059803 | 4/2016 |

OTHER PUBLICATIONS

Extended European Search Report for European Patent Application No. 18899809.0 dated Dec. 21, 2020.

* cited by examiner

FRONT-BACK DIRECTION

DISPLAY DEVICE AND METHOD OF INSTALLING DISPLAY DEVICE

CROSS-REFERENCE TO RELATED APPLICATIONS

This application is a Continuation of PCT International Application No. PCT/JP2018/037929 filed in Japan on Oct. 11, 2018, which claims priority to and incorporates by references the entire contents of Japanese Patent Application No. 2018-002086 filed in Japan on Jan. 10, 2018.

FIELD

The present application relates to a display device and a method of installing the display device.

BACKGROUND

For example, a head-up display device (hereinafter, referred to as a "HUD device") mounted on a vehicle has been known. A windshield of a vehicle is curved in a front-back direction and in a left-right direction. A ray path from a HUD device to a viewpoint of a driver in the HUD device installed for the driver in a vehicle with a right-hand steering wheel differs from that in a HUD device installed for a driver in a vehicle with a left-hand steering wheel. Therefore, the HUD device installed for the driver in the vehicle with the right-hand steering wheel and the HUD device installed for the driver in the vehicle with the left-hand steering wheel need to be designed so as to have the different ray paths, and it is necessary to arrange different components.

An on-vehicle device in which some components can be shared between the vehicle with the right-hand steering wheel and the vehicle with the left-hand steering wheel has been known (for example, see Japanese Laid-open Patent Publication No. 2014-119718 A).

SUMMARY

In Japanese Laid-open Patent Publication No. 2014-119718 A, it is possible to share some components, but it is impossible to share some other components. Therefore, it is desired to share a large number of components.

A display device and a method of installing the display device are disclosed.

According to one aspect, there is provided a display device comprising: a display configured to display a video; a concave mirror configured to reflect a video display light of the video displayed on the display toward a reflection part that is formed in a curved shape and that faces a viewer; and a housing in which the display and the concave mirror are assembled, wherein an angle of the concave mirror with respect to the housing is adjustable by rotating the concave mirror on a reference plane of the housing in accordance with a relative positional relationship among the housing, the reflection part, and the viewer.

According to one aspect, there is provided a method of installing a display device including: a display configured to display a video; a concave mirror configured to reflect a video display light of the video displayed on the display toward a reflection part that is formed in a curved shape and that faces a viewer; and a housing in which the display and the concave mirror are assembled, the method comprising: adjusting a mounting posture of the housing to a certain posture by rotating the housing by a first certain angle with respect to a mounted portion, the first certain angle being twice an angle between a first central ray of the video display light of the video displayed on the display and a second central ray that is reflected by the reflection part and reaches the viewer, both in a case in which the viewer is located at a first position in which the viewer faces the reflection part that is formed in the curved shape with a symmetric curvature with respect to a symmetric surface, and in a case in which the viewer is located at a second position that is symmetric to the first position with respect to the symmetric surface, and adjusting an angle of the concave mirror by rotating the concave mirror by a second certain angle with reference to the reference plane of the housing, the second certain angle being twice an angle between a normal line of the first central ray on the reference plane of the housing and a central line of the concave mirror on the reference plane.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Embodiments of a head-up display device (a display device, which is hereinafter referred to as a "HUD device") 1 according to the present application will be described in details below with reference to the accompanying drawings. The present application is not limited by the embodiments below.

In the following description, each of directions is defined in a state in which the HUD device 1 is mounted in front of a driver seat of a vehicle. A front-back direction is a direction parallel to a traveling direction when the vehicle travels in a straight line, where a direction toward a driver seat side is referred to as a "back side" in the front-back direction and a direction toward a windshield S side on the front is referred to as a "front side" in the front-back direction. A left-right direction is a direction horizontally perpendicular to the front-back direction. A left side viewed from the driver seat side is referred to as "left", and a right side is referred to as "right". A vertical direction is a direction perpendicular to the front-back direction and the left-right direction. Therefore, the front-back direction, the left-right direction, and the vertical direction are perpendicular to one another in a three-dimensional manner. Further, a plane parallel to a road surface when the vehicle is located on a flat road surface will be referred to as a vehicle horizontal plane.

First Embodiment

Figure 1:
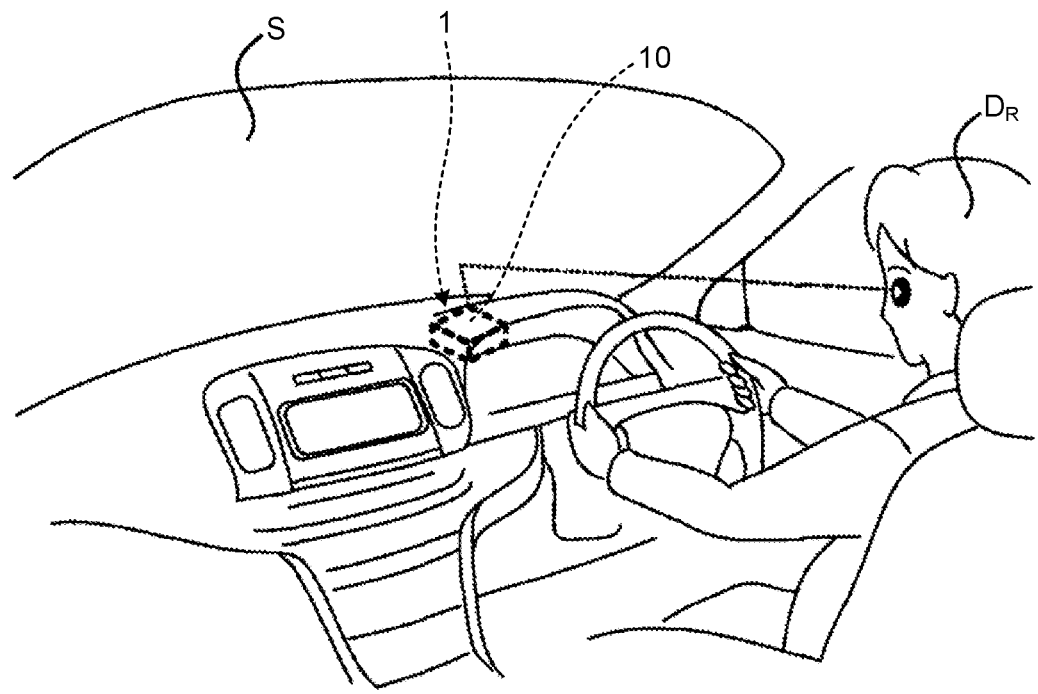
FIG. 1 is a diagram illustrating a state in which a head-up display device according to a first embodiment is mounted for a driver on a vehicle with a right-hand steering wheel.
Figure 2:
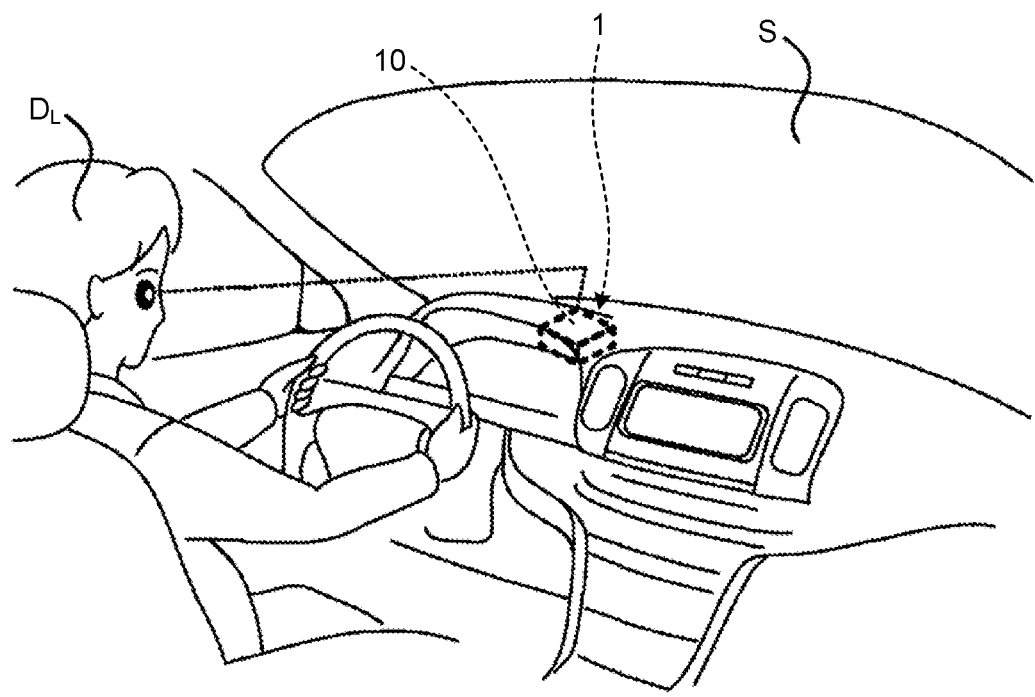
FIG. 2 is a diagram illustrating a state in which the head-up display device according to the first embodiment is mounted for a driver on a vehicle with a left-hand steering wheel.
Figure 3:
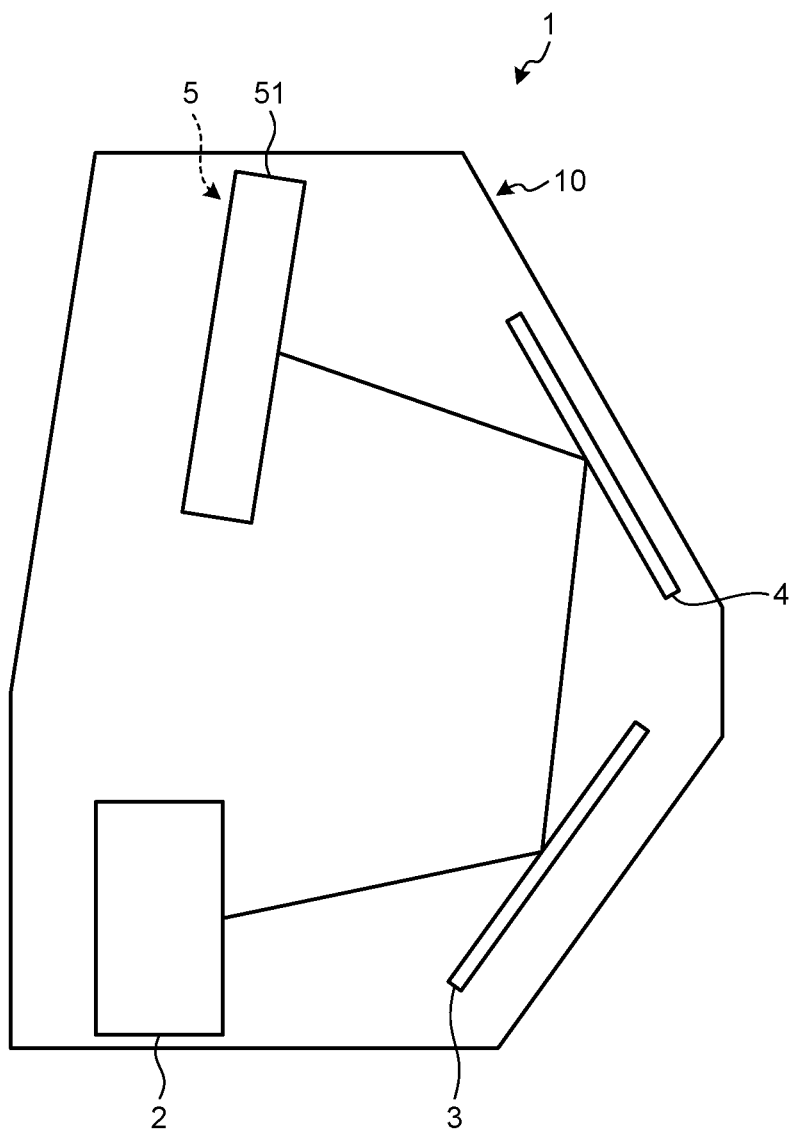
FIG. 3 is a schematic diagram in a plan view of the head-up display device according to the first embodiment.
Figure 4:
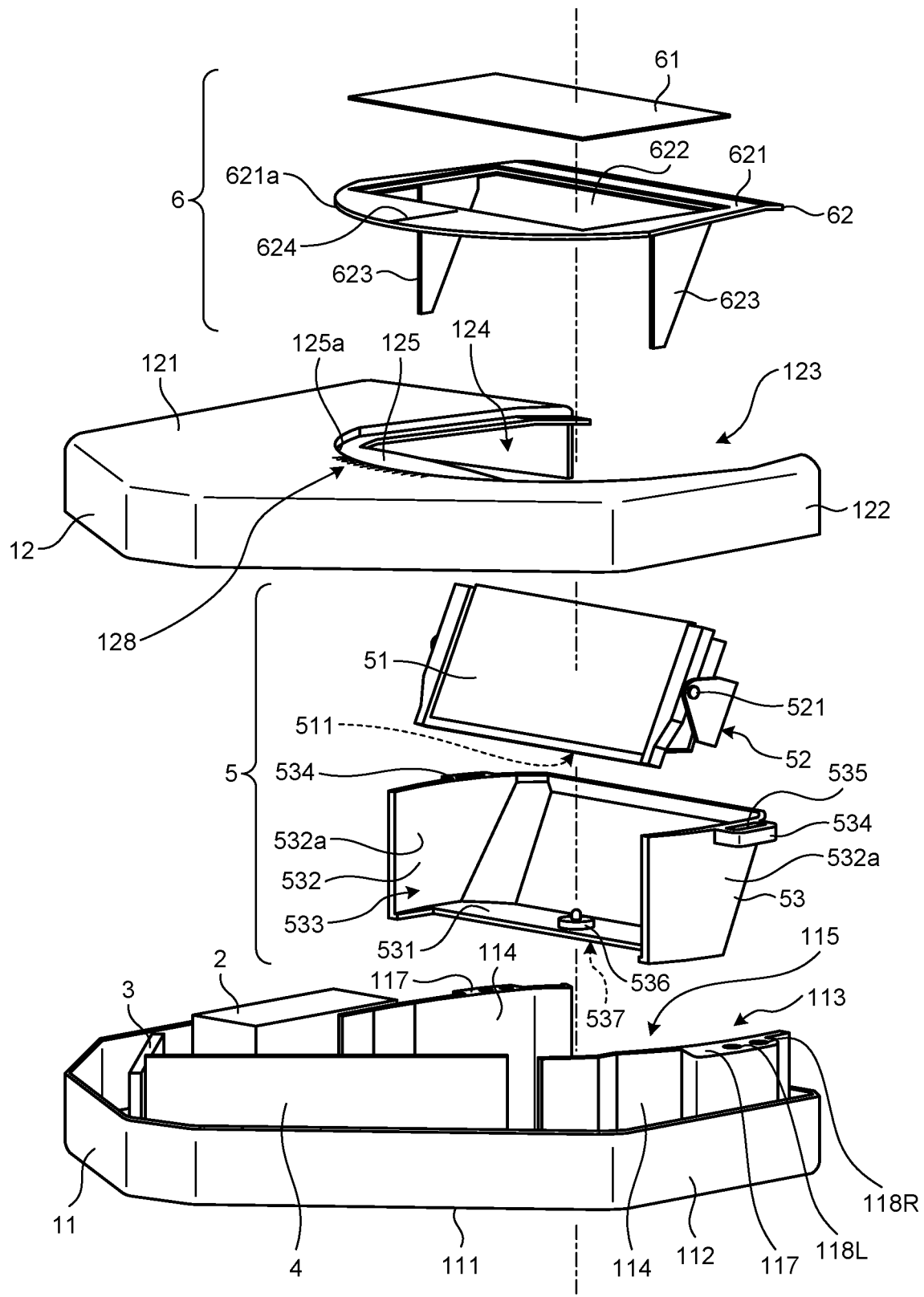
FIG. 4 is an exploded perspective view from one direction of the head-up display device according to the first embodiment.
Figure 5:
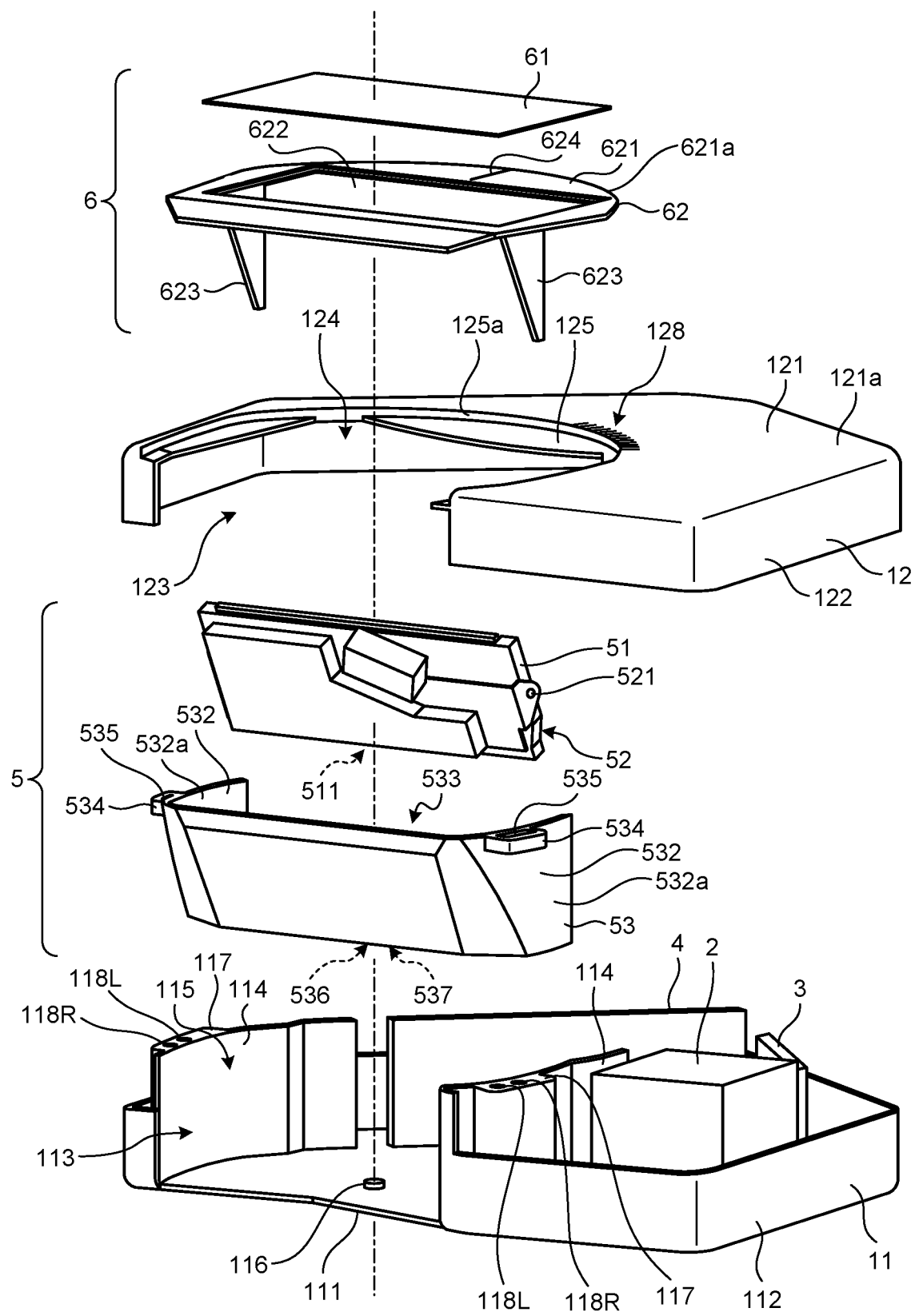
FIG. 5 is an exploded perspective view from another direction of the head-up display device according to the first embodiment.
Figure 6:
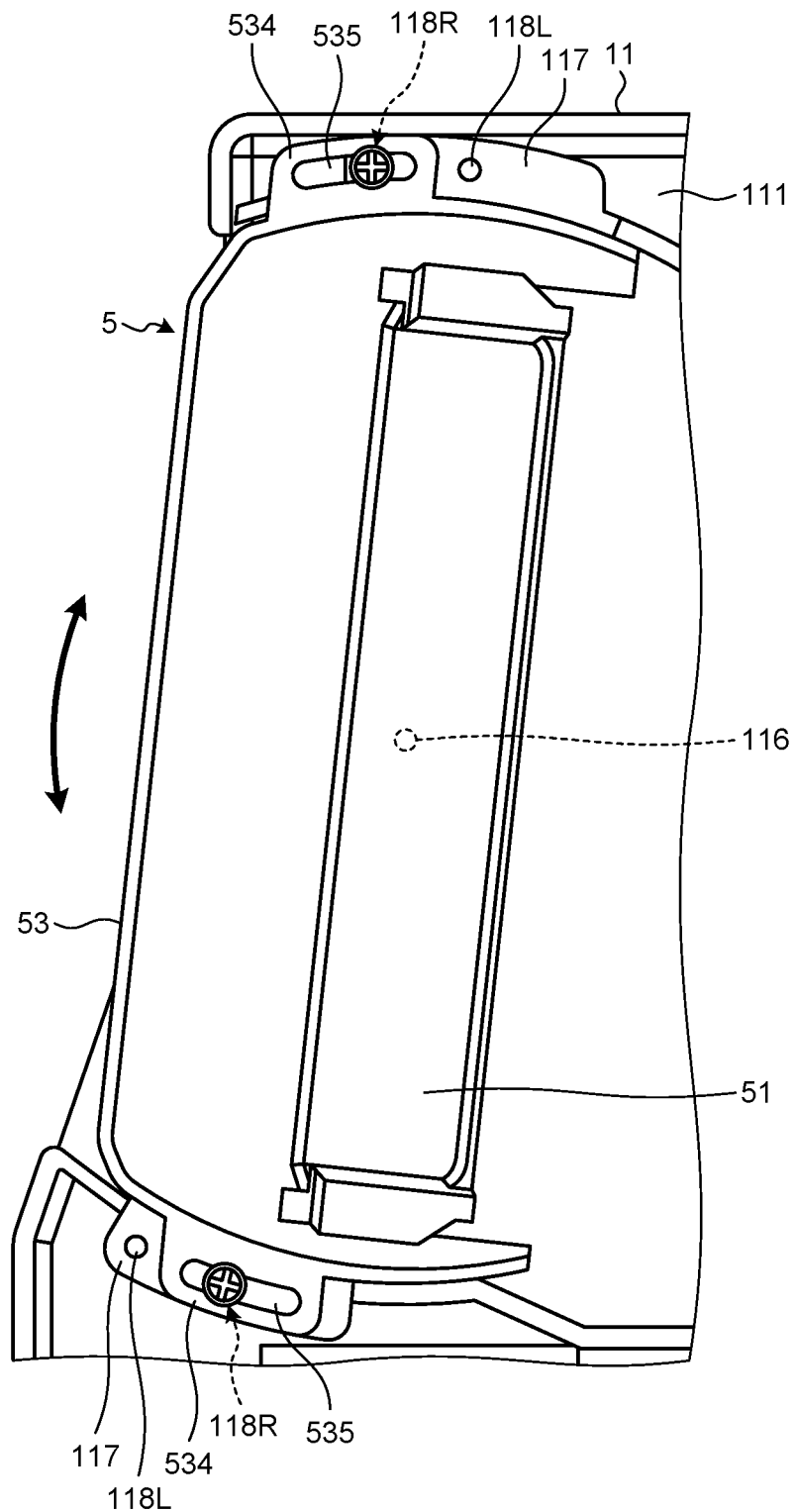
FIG. 6 is a plan view of a concave mirror unit in the head-up display device according to the first embodiment.
Figure 7:
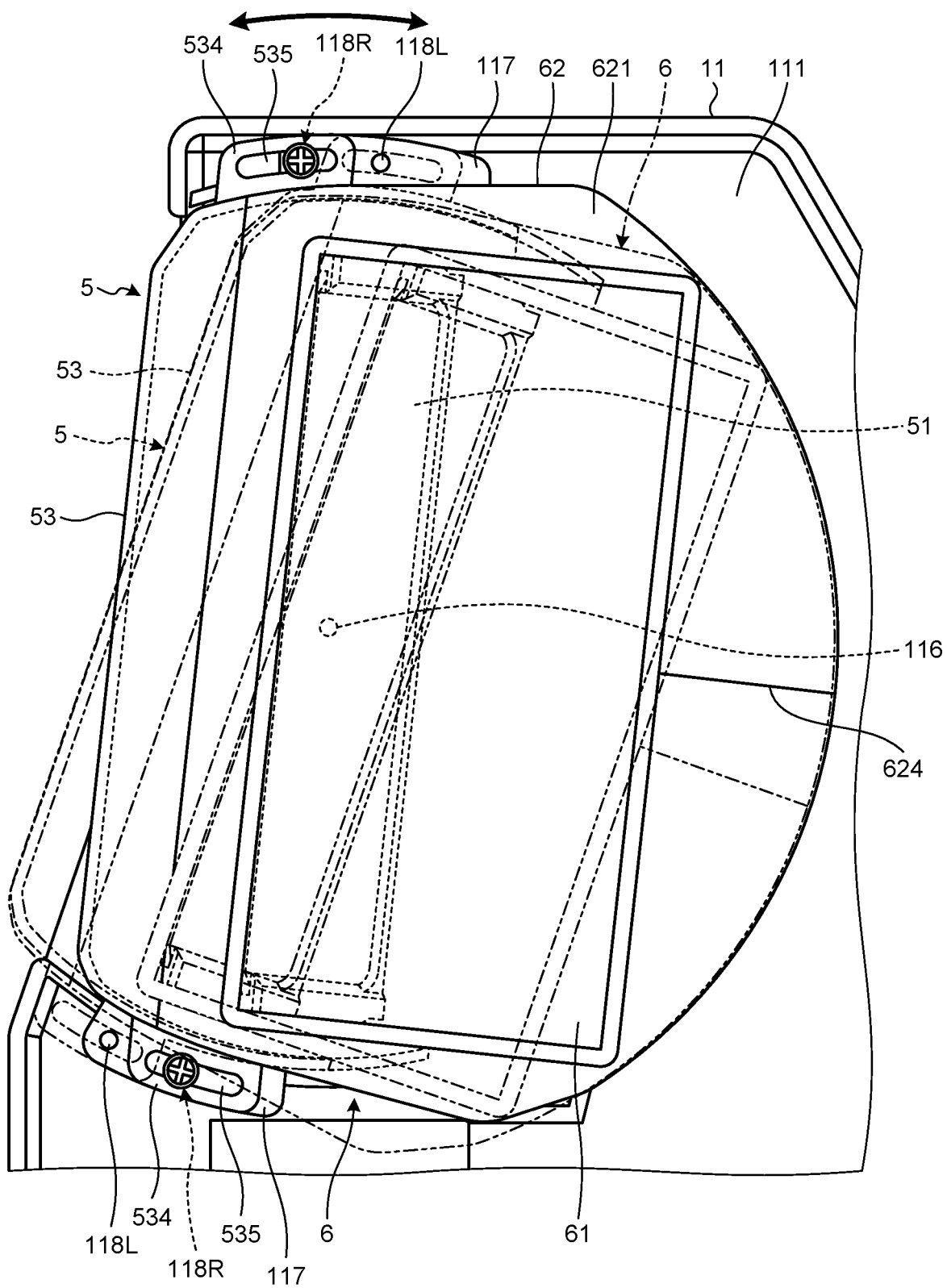
FIG. 7 is a plan view of the concave mirror unit and a cover unit in the head-up display device according to the first embodiment.

The HUD device 1 will be described with reference to FIG. 1 to FIG. 7. FIG. 1 is a diagram illustrating a state in which a head-up display device according to a first embodiment is mounted for a driver on a vehicle with a right-hand steering wheel. FIG. 2 is a diagram illustrating a state in which the head-up display device according to the first embodiment is mounted for a driver on a vehicle with a left-hand steering wheel. FIG. 3 is a schematic diagram in a plan view of the head-up display device according to the first embodiment. FIG. 4 is an exploded perspective view from one direction of the head-up display device according to the first embodiment. FIG. 5 is an exploded perspective view from another direction of the head-up display device according to the first embodiment. FIG. 6 is a plan view of a concave mirror unit in the head-up display device according to the first embodiment. FIG. 7 is a plan view of the concave mirror unit and a cover unit in the head-up display device according to the first embodiment.

The HUD device 1 projects, as a virtual image, drive support information including, for example, route guide information or vehicle speed information on the front of the vehicle, and allows a driver (viewer) D to recognize the virtual image. In the HUD device 1, a video display light projected by a concave mirror unit 5 is reflected by a windshield S, and recognized as the virtual image by the viewer.

The windshield S of the vehicle is curved in the vertical direction and the left-right direction. More specifically, the windshield S is formed in a curved shape with a symmetric curvature with respect to a symmetric surface V as a plane that passes through a central portion of the windshield S in the left-right direction, that is parallel to the front-back direction, and that is perpendicular to the vehicle horizontal plane. Therefore, by allowing adjustment of a posture of the HUD device 1 both in a case of installation for a driver $D_R$ in a vehicle with a right-hand steering wheel and in a case of installation for a driver $D_L$ in a vehicle with a left-hand steering wheel, it is possible to install the HUD device for the drivers D in both of the vehicle with the right-hand steering wheel and the vehicle with the left-hand steering wheel. A seating position of the driver $D_R$ in the vehicle with the right-hand steering wheel is referred to as a first position, and a seating position of the driver $D_L$ in the vehicle with the left-hand steering wheel is referred to as a second position. The first position and the second position are symmetric to each other with respect to the symmetric surface V.

The HUD device 1 includes a display 2, the concave mirror unit 5, a cover unit 6, and a housing 10. In the first embodiment, the HUD device 1 includes a first reflecting mirror 3 and a second reflecting mirror 4 on a ray path between the display 2 and the concave mirror unit 5.

The housing 10 is arranged below a dashboard of the vehicle, which is referred to as a mounted portion. The housing 10 is formed in a box shape by assembling a lower housing 11 and an upper housing 12. The housing 10 houses the display 2, the first reflecting mirror 3, the second reflecting mirror 4, and the concave mirror unit 5 that are assembled in an inner space thereof.

A mounting posture of the housing 10 with respect to the dashboard of the vehicle is adjustable by rotating the housing 10 on the vehicle horizontal plane that is a reference plane, in accordance with a relative positional relationship among the housing 10, the windshield S, and the driver D. In the first embodiment, explanation of a mounting portion of the housing 10 on the vehicle and the mounted portion arranged on the vehicle side will be omitted. Meanwhile, the mounted portion of the vehicle is symmetric with respect to the symmetric surface V.

The lower housing 11 includes a wall portion 111 serving as a bottom wall, a wall portion 112 serving as a side wall, an opening 113, a pair of inner wall portions 114, a space portion 115, and a convex portion 116. The wall portion 111, the wall portion 112, the pair of inner wall portions 114, and the convex portion 116 are formed in an integrated manner.

The wall portion 111 is formed in a flat plane shape. In the first embodiment, the wall portion 111 is formed in a heptagon shape when viewed from the vertical direction. Each of members housed in the housing 10 is mounted on the wall portion 111. In the first embodiment, the wall portion 111 is formed in a flat plane shape parallel to the vehicle horizontal plane (the reference plane of the mounted portion) in a state in which the HUD device 1 is installed in the vehicle. An extended plane of the wall portion 111 serves as a reference plane of the housing 10.

The wall portion 112 is arranged so as to stand upward from a circumferential edge of the wall portion 111. The wall portion 112 is arranged on the circumferential edge of the wall portion 111 except for a part of the circumferential edge. In other words, the wall portion 112 includes the opening 113 in a circumferential direction of the wall portion 111.

The opening 113 exposes a casing 53 of the concave mirror unit 5 in a state in which the HUD device 1 is assembled.

The pair of inner wall portions 114 are formed so as to face each other on an inner side of the wall portion 112. The pair of inner wall portions 114 are arranged so as to stand upward from the wall portion 111. End portions of the inner wall portions 114 are arranged so as to be connected to end portions of the wall portion 112 in the circumferential direction. The inner wall portions 114 are formed in curved surface shapes that are curved in circular arc shapes when viewed from the vertical direction. The inner wall portions 114 have circular arc shapes corresponding to curved portions 532a that are parts of a wall portion 532 of the casing 53.

The space portion 115 is a space that communicates with the opening 113 and that is enclosed by the wall portion 111 and the pair of the inner wall portions 114. The concave mirror unit 5 is assembled in the space portion 115.

The convex portion 116 is arranged on the wall portion 111 facing the space portion 115. The convex portion 116 is arranged so as to stand upward from the wall portion 111. The convex portion 116 is formed in a cylindrical shape. The convex portion 116 is inserted in a hole portion 537 of the concave mirror unit 5. A central line of the convex portion 116 serves as a rotation center when the concave mirror unit 5 rotates with respect to the housing 10. In the first embodiment, a point through which a central ray passes in the concave mirror unit 5 is located directly above the convex portion 116.

A pair of support portions 117 are formed in an integrated manner with the pair of the inner wall portions 114. The support portions 117 are formed so as to be thicker than the inner wall portions 114. On the pair of support portions 117, a pair of flange portions 534 of the casing 53 of the concave mirror unit 5 is placed in a state in which the HUD device 1 is assembled.

Female screw portions 118 are formed on the pair of support portions 117. The female screw portions 118 are screwed together with male screws that fasten the concave mirror unit 5 and the housing 10. The female screw portions 118 allow positioning such that an angle of the concave mirror unit 5 with respect to the housing 10 is determined at an appropriate position both in the case of installation for the driver $D_R$ in the vehicle with the right-hand steering wheel and in the case of installation for the driver $D_L$ in the vehicle with the left-hand steering wheel. In the first embodiment, each of the female screw portions 118 includes a female screw portion 118R and a female screw portion 118L formed on each of the support portions 117. By fastening the concave mirror unit 5 with the female screw portions 118R, the position of the concave mirror unit 5 is determined at an appropriate installation angle for the driver $D_R$ in the vehicle with the right-hand steering wheel. By fastening the concave mirror unit 5 with the female screw portions 118L, the position of the concave mirror unit 5 is determined at an appropriate installation angle for the driver $D_L$ in the vehicle with the left-hand steering wheel. The female screw portion 118R and the female screw portion 118L that are formed on the same support portion 117 are formed at certain positions at which a mounting angle of the concave mirror unit 5 meets 2×B° in accordance with an adjustment width of a long hole 535. In the first embodiment, the female screw portion 118R and the female screw portion 118L are formed at positions at which the mounting angle of the concave mirror unit 5 meets 10°, for example.

The upper housing 12 is arranged so as to face the lower housing 11. The upper housing 12 includes a wall portion 121 that serves as a cover portion, a wall portion 122 that serves as a side wall, an opening 123, a notch portion 124, a concave portion 125, and scales 128. The wall portion 121 and the wall portion 122 are formed in an integrated manner.

The wall portion 121 is formed in a flat plane shape. The wall portion 121 faces the wall portion 111 in a state in which the lower housing 11 and the upper housing 12 are assembled. In the first embodiment, the wall portion 121 is formed in a heptagon shape corresponding to the wall portion 111 when viewed from the vertical direction.

The wall portion 122 is arranged so as to stand downward from a circumferential edge of the wall portion 121. The wall portion 122 is connected to the wall portion 112 and serves as a side wall of the housing 10 in a state in which the lower housing 11 and the upper housing 12 are assembled. The wall portion 122 is arranged on the circumferential edge of the wall portion 121 except for a part of the circumferential edge. In other words, the wall portion 122 includes the opening 123 in a circumferential direction of the wall portion 121.

The opening 123 communicates with the opening 113 in a state in which the lower housing 11 and the upper housing 12 are assembled. The opening 123 exposes the casing 53 of the concave mirror unit 5 in a state in which the HUD device 1 is assembled.

The notch portion 124 is formed at a certain position communicating with the opening 123 in the wall portion 121. The notch portion 124 communicates with the opening 113 and the opening 123 in a state in which the lower housing 11 and the upper housing 12 are assembled. The notch portion 124 allows the video display light that is projected from the concave mirror unit 5 toward the windshield S to pass therethrough.

The concave portion 125 is formed at a circumferential edge of the notch portion 124 on a top surface 121a of the wall portion 121. The concave portion 125 is recessed downward from the top surface 121a. A curved portion 125a as a part of a circumferential edge of the concave portion 125 is formed in a circular arc shape. A frame portion 621 of the cover unit 6 is placed on the concave portion 125 in a state in which the HUD device 1 is assembled.

The scales 128 measure a rotation angle of the concave mirror unit 5 with respect to the housing 10. The scales 128 are arranged on the top surface 121a of the wall portion 121. The scales 128 are arranged at equal intervals of 1°, for example.

The display 2 is a display including, for example, a liquid crystal display (LCD), an organic electro-luminescence (EL) display, or the like. The display 2 displays a video on a display surface based on a video signal obtained from a display control unit (not illustrated). A video display light of the video that is displayed on the display surface of the display 2 enters the first reflecting mirror 3.

A reflecting surface of the first reflecting mirror 3 faces the display surface of the display 2 and a reflecting surface of the second reflecting mirror 4. The first reflecting mirror 3 reflects the video display light that has entered from the display 2 toward the second reflecting mirror 4.

The reflecting surface of the second reflecting mirror 4 faces the reflecting surface of the first reflecting mirror 3 and a reflecting surface of a concave mirror 51 of the concave mirror unit 5. The second reflecting mirror 4 reflects the video display light that has entered from the first reflecting mirror 3 toward the concave mirror 51.

The concave mirror unit 5 is constructed by assembling the concave mirror 51, a driving unit 52, and the casing 53.

The concave mirror 51 has a symmetric curvature with respect to a concave mirror symmetric surface as a plane that passes through a concave mirror center serving as a pass point of a central ray of the video display light and that is perpendicular to the vehicle horizontal plane. The reflecting surface of the concave mirror 51 faces the reflecting surface of the second reflecting mirror 4 and a reflecting surface of the windshield S. The concave mirror 51 reflects the video display light that has entered from the second reflecting mirror 4 toward the windshield S. The video display light that has reflected by the concave mirror 51 is reflected by the windshield S and recognized as a virtual image by the viewer. The concave mirror center of the concave mirror 51 is located directly above the convex portion 116.

The concave mirror 51 is able to rotate on the wall portion 111 to adjust an angle with respect to the housing 10, in accordance with the relative positional relationship among the housing 10, the windshield S, and the driver D.

A hole portion 511 is formed directly below the concave mirror center. The hole portion 511 is formed in a cylindrical shape that fits to a convex portion 536 of the casing 53.

The driving unit 52 adjusts an inclination of the concave mirror 51 to adjust a look-down angle due to a difference of a sitting height of the driver D. The driving unit 52 is arranged on an opposite side of the reflecting surface of the concave mirror 51. The driving unit 52 includes a rotation shaft 521 that passes through the concave mirror center and that is arranged parallel to the wall portion 111, and a driving source (not illustrated). The rotation shaft 521 is connected to the concave mirror 51. The driving unit 52 rotates the rotation shaft 521 by using the driving source, and adjusts the inclination of the concave mirror 51.

The casing 53 houses the concave mirror 51 and the driving unit 52. The casing 53 includes a wall portion 531 that serves as a bottom wall, the wall portion 532 that serves as a side wall, an opening 533, the pair of flange portions 534, the long holes (second positioning portions) 535, the convex portion 536, and the hole portion 537. The wall portion 531, the wall portion 532, the pair of flange portions 534, and the convex portion 536 are formed in an integrated manner.

The wall portion 531 is formed in a flat plane shape. The wall portion 531 faces the wall portion 111 in a state in which the concave mirror unit 5 is assembled on the housing 10.

The wall portion 532 is arranged so as to stand upward from a circumferential edge of the wall portion 531. The wall portion 532 is arranged on the circumferential edge of the wall portion 531 except for a part of the circumferential edge. In other words, the wall portion 532 includes the opening 533 in a circumferential direction of the wall portion 531. The wall portion 532 faces an opposite side of the reflecting surface of the concave mirror 51 in a state in which the concave mirror unit 5 is assembled on the housing 10. The wall portion 532 has the curved portions 532a that are formed in curved surface shapes that are curved in circular arc shapes when viewed from the vertical direction. The curved portions 532a have circular arc shapes corresponding to the inner wall portions 114. In other words, in a state in which the concave mirror unit 5 is assembled on the housing 10, the inner wall portions 114 and the curved portions 532a face each other. Further, when the concave mirror unit 5 rotates with respect to the housing 10, the curved portions 532a slide along the inner wall portions 114. With this configuration, the inner wall portions 114 and the curved portions 532a prevent a gap from being generated between the housing 10 and the concave mirror unit 5.

The opening 533 exposes the reflecting surface of the concave mirror 51 in a state in which the concave mirror unit 5 is assembled. The opening 533 allows the video display light that is projected from the concave mirror unit 5 toward the windshield S to pass therethrough.

The pair of flange portions 534 are extended outward in a radial direction from the wall portion 532. The pair of flange portions 534 are placed on the pair of support portions 117 in a state in which the concave mirror unit 5 is assembled on the housing 10.

The long holes 535 are formed on the flange portions 534. The long holes 535 are formed in circular arc shapes corresponding to the rotation direction of the concave mirror unit 5. The long holes 535 and the female screw portions 118 are fastened together with fastening members in a state in which the pair of support portions 117 and the pair of flange portions 534 overlap with each other such that the long holes 535 and the female screw portions 118 overlap with each other. With this configuration, it is possible to perform positioning such that the angle of the concave mirror unit 5 with respect to the housing 10 is determined at an appropriate position both in the case of installation for the driver $D_R$ in the vehicle with the right-hand steering wheel and the case of installation for the driver $D_L$ in the vehicle with the left-hand steering wheel. More specifically, by fastening, with the fastening members, the long holes 535 and the female screw portions 118R in the overlapping state, positioning is performed at an appropriate installation angle for the driver $D_R$ in the vehicle with the right-hand steering wheel. By fastening, with the fastening members, the long holes 535 and the female screw portions 118L in the overlapping state, positioning is performed at an appropriate installation angle for the driver $D_L$ in the vehicle with the left-hand steering wheel. In the first embodiment, the long holes 535 are formed so as to cover a range in which the concave mirror unit 5 is rotated and positioned with respect to the housing 10 in the case of installation in the vehicle with the right-hand steering wheel and in the case of installation in the vehicle with the left-hand steering wheel. Further, it is preferable that the long holes 535 are formed so as to cover a range in which the concave mirror unit 5 is rotated and positioned with respect to the housing 10 in the case of installation in the vehicle with the right-hand steering wheel and the vehicle with the left-hand steering wheel of various vehicle types.

The convex portion 536 is formed on a top surface in an upper side of the wall portion 531, and has a cylindrical shape that fits to the hole portion 511. The convex portion 536 is arranged directly below the concave mirror center in a state in which the concave mirror unit 5 is assembled.

The hole portion 537 is formed on a back surface opposite to the top surface of the wall portion 531, and has a cylindrical shape that is rotatably engaged with the convex portion 116. The hole portion 537 is arranged directly below the concave mirror center in a state in which the concave mirror unit 5 is assembled.

The concave mirror 51 and the driving unit 52 are assembled on the casing 53 configured as described above. The concave mirror unit 5 configured as described above is assembled on the housing 10. The concave mirror unit 5 integrally rotates with respect to the housing 10 around the convex portion 116 in a state in which the concave mirror unit 5 is assembled on the housing 10. The concave mirror unit 5 is rotatable in an angular range of about 20° with respect to the housing 10, for example.

The cover unit 6 is a cover that covers an upper part of the concave mirror unit 5. The cover unit 6 prevents dust from entering inside of the concave mirror unit 5 and the housing 10. The cover unit 6 allows the video display light that travels from the concave mirror 51 toward the windshield S to pass therethrough. The cover unit 6 includes a transmission part 61 and a holder 62.

The transmission part 61 transmits the video display light that is reflected by the reflecting surface of the concave mirror 51 and travels toward the windshield S. In other words, the transmission part 61 projects the video display light from the housing 10. The transmission part 61 is formed in a transparent and flat plate material. The transmission part 61 is formed in a rectangular shape.

The holder 62 is a support portion that supports the transmission part 61. The holder 62 includes a frame portion 621, an opening 622, a pair of brim portions 623, and a reference line 624.

The frame portion 621 is formed of a flat plate material. The frame portion 621 covers a circumferential edge of the transmission part 61 that is arranged so as to cover the opening 622. The frame portion 621 is formed in a certain shape that is fitted to the concave portion 125 of the wall portion 121. A curved portion 621a that is a part of the circumferential edge of the frame portion 621 is formed in a circular arc shape corresponding to the curved portion 125a of the concave portion 125.

The opening 622 is formed in a rectangular shape in a central portion of the frame portion 621. The opening 622 is covered by the transmission part 61.

The pair of brim portions 623 are arranged so as to stand downward from the frame portion 621. The pair of brim portions 623 prevents a gap from being generated between the concave mirror 51 and the inner wall portions 114 when the concave mirror unit 5 rotates with respect to the housing 10. The pair of brim portions 623 blocks light that is reflected by the inner wall portion 114 or the like of the lower housing 11 due to spreading of the display light from the display 2 when the concave mirror unit 5 rotates, and prevents a structure of a peripheral portion of the concave mirror 51 from being viewed from outside.

The reference line 624 is arranged on the top surface of the frame portion 621. The reference line 624 faces the scales 128 in a state in which the HUD device 1 is assembled. The reference line 624 indicates the scales 128 to allow measurement of the rotation angle of the concave mirror unit 5 with respect to the housing 10.

The cover unit 6 configured as described above is assembled on the concave mirror unit 5. With this configuration, the cover unit 6 rotates with respect to the housing 10, in conjunction with the rotation of the concave mirror unit 5 with respect to the housing 10.

Next, an installation method and effects of the HUD device 1 configured as described above will be described.

Figure 8:
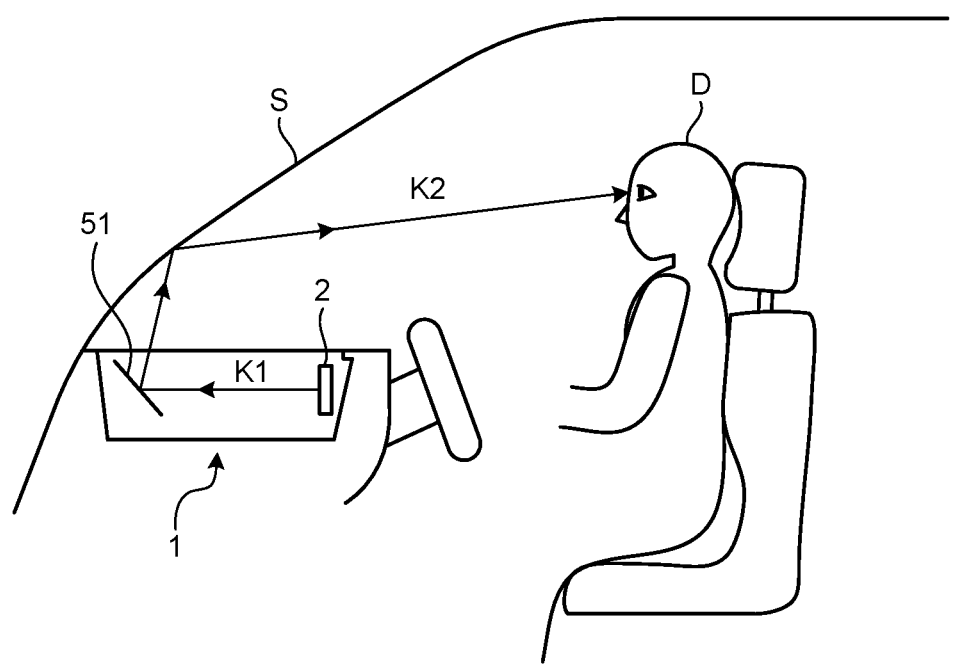
FIG. 8 is a diagram for explaining a ray path from the head-up display device according to the first embodiment to a driver.
Figure 9:
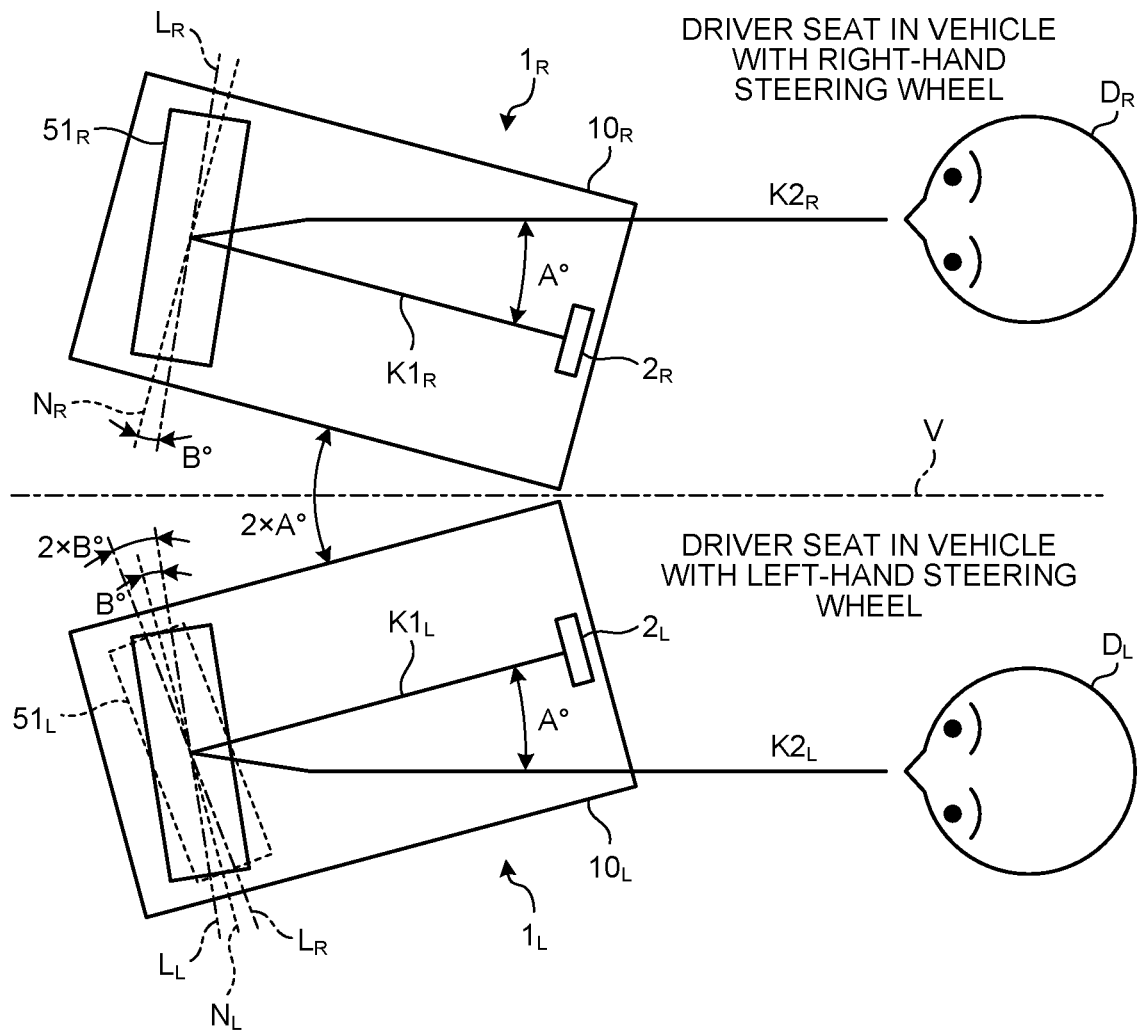
FIG. 9 is a diagram for explaining ray paths from the head-up display device according to the first embodiment to drivers.

With reference to FIG. 8 and FIG. 9, ray paths in the case in which the HUD device 1 configured as described above is installed for the driver $D_R$ in the vehicle with the right-hand steering wheel and in the case in which the HUD device 1 is installed for the driver $D_L$ in the vehicle with the left-hand steering wheel will be described. FIG. 8 is a diagram for explaining a ray path from the head-up display device according to the first embodiment to the driver D. FIG. 9 is a diagram for explaining ray paths from the head-up display device according to the first embodiment to the drivers D. If it is not necessary to distinguish between the left and the right, explanation will be given without distinguishing between the left and the right. For simplicity of explanation, it is assumed that the HUD device 1 includes the display 2 and the concave mirror 51, and does not include reflecting mirrors. The housing 10 viewed from the vertical direction has a rectangular shape elongated in the front-back direction.

As illustrated in FIG. 8, a first central ray K1 projected from the display 2 enters the concave mirror 51. The first central ray K1 reflected by the concave mirror 51 is reflected by the windshield S and reaches the driver D as a second central ray K2. The HUD device 1 is mounted on the vehicle in an adjusted posture such that a direction in which the second central ray K2 extends becomes parallel to the front-back direction when viewed from the vertical direction. In the example illustrated in FIG. 8, the direction in which the second central ray K2 extends is inclined from the windshield S toward the driver D when viewed from the left-right direction.

As illustrated in FIG. 9, the HUD device 1 that is installed for the driver $D_R$ in the vehicle with the right-hand steering wheel is referred to as a HUD device $1_R$. The HUD device $1_R$ is installed on a dashboard in front of the driver $D_R$ in the vehicle with the right-hand steering wheel. A long side of a housing $10_R$ is inclined with respect to the front-back direction when viewed from the vertical direction. A first central ray $K1_R$ that is projected from a display $2_R$ extends in a direction parallel to the long side of the housing $10_R$ when viewed from the vertical direction. The first central ray $K1_R$ is inclined with respect to the front-back direction. An angle between the first central ray $K1_R$ and the second central ray $K2_R$ is A°. A central line $L_R$ of a concave mirror $51_R$ is inclined by an angle B° with respect to a normal line NR of the first central ray $K1_R$.

As illustrated in FIG. 9, the HUD device 1 that is installed for the driver $D_L$ in the vehicle with the left-hand steering wheel is referred to as a HUD device $1_L$. The HUD device $1_L$ is installed on a dashboard in front of the driver $D_L$ in the vehicle with the left-hand steering wheel. The HUD device $1_L$ is positioned such that a concave mirror center of a concave mirror $51_L$ and a concave mirror center of the concave mirror $51_R$ are located at symmetric positions with respect to the symmetric surface V. The HUD device $1_L$ is located at a position at which the HUD device $1_R$ is rotated by an angle of 2×A° in a counterclockwise direction on the vehicle horizontal plane. An angle between a first central ray $K1_L$ and a second central ray $K2_L$ is set to A°. Further, the concave mirror $51_L$ is located at a position at which the concave mirror $51_R$ is rotated by an angle of 2×B° in a clockwise direction on the vehicle horizontal plane. In other words, an angle between the central line $L_R$ of the concave mirror $51_R$ and a central line $L_L$ of the concave mirror $51_L$ is 2×B°. In the HUD device $1_L$ whose posture is adjusted as described above, the central line $L_L$ of the concave mirror $51_L$ is inclined by the angle of B° with respect to a normal line $N_L$ of the first central ray $K1_L$ that comes from a display $2_L$.

In this manner, in the HUD device $1_R$ and the HUD device $1_L$, a set of the central ray coming from the concave mirror $51_R$ to the windshield S and the second central ray $K2_R$ and a set of the central ray coming from the concave mirror $51_L$ to the windshield S and the second central ray $K2_L$ form mirror images with respect to the symmetric surface V that passes through the central portion of the vehicle in the left-right direction and that is parallel to the front-back direction. Further, the first central ray $K1_R$ and the first central ray $K1_L$ form mirror images with respect to the symmetric surface V. Furthermore, the inclination of the display surface of the display $2_R$ with respect to the symmetric surface V and the inclination of the display surface of the display $2_L$ with respect to the symmetric surface V form mirror images with respect to the symmetric surface V. Moreover, the inclination of the central line $L_R$ of the concave mirror $51_R$ with respect to the symmetric surface V and the inclination of the central line $L_L$ of the concave mirror $51_L$ with respect to the symmetric surface V form mirror images with respect to the symmetric surface V.

With this configuration, as an installation condition for the HUD device 1 in which the left-right direction of a virtual image viewed by the driver D becomes horizontal, it is satisfactory to install the HUD device $1_R$ and the HUD device $1_L$ such that the angles A between the first central rays K1 coming from the displays 2 to the concave mirrors 51 and the second central rays K2 coming from the windshield S to eye points of the drivers D and the angles B between the normal lines N of the first central rays K1 in the horizontal direction of the vehicle and the central lines L of the concave mirrors 51 in the horizontal direction of the vehicle form mirror images with respect to the symmetric surface V. Meanwhile, the angle A and the angle B are set in accordance with a mounting angle that depends on a curve of the windshield S and a type of the vehicle.

Therefore, in the case of installation for the driver $D_R$ in the vehicle with the right-hand steering wheel and in the case of installation for the driver $D_L$ in the vehicle with the left-hand steering wheel, it is satisfactory to perform the installation such that (Condition i) and (condition ii) below are met. By satisfying (Condition i) and (condition ii), it becomes possible to allow the driver D to view an appropriate virtual image.

(Condition i): In the case of installation for the driver $D_L$, the housing 10 is positioned in a certain posture in which the housing 10 is rotated by the angle of $2 \times A°$ in the counterclockwise direction from the posture in which the housing 10 is installed for the driver $D_R$, on a plane parallel to the vehicle horizontal plane.

(Condition ii): In the case of installation for the driver $D_L$, the concave mirror 51 is positioned in a certain posture in which the concave mirror 51 is rotated by the angle of $2 \times B°$ in the clockwise direction from the posture in which the concave mirror 51 is installed for the driver $D_R$, on a plane parallel to the vehicle horizontal plane in the housing 10.

Figure 10:
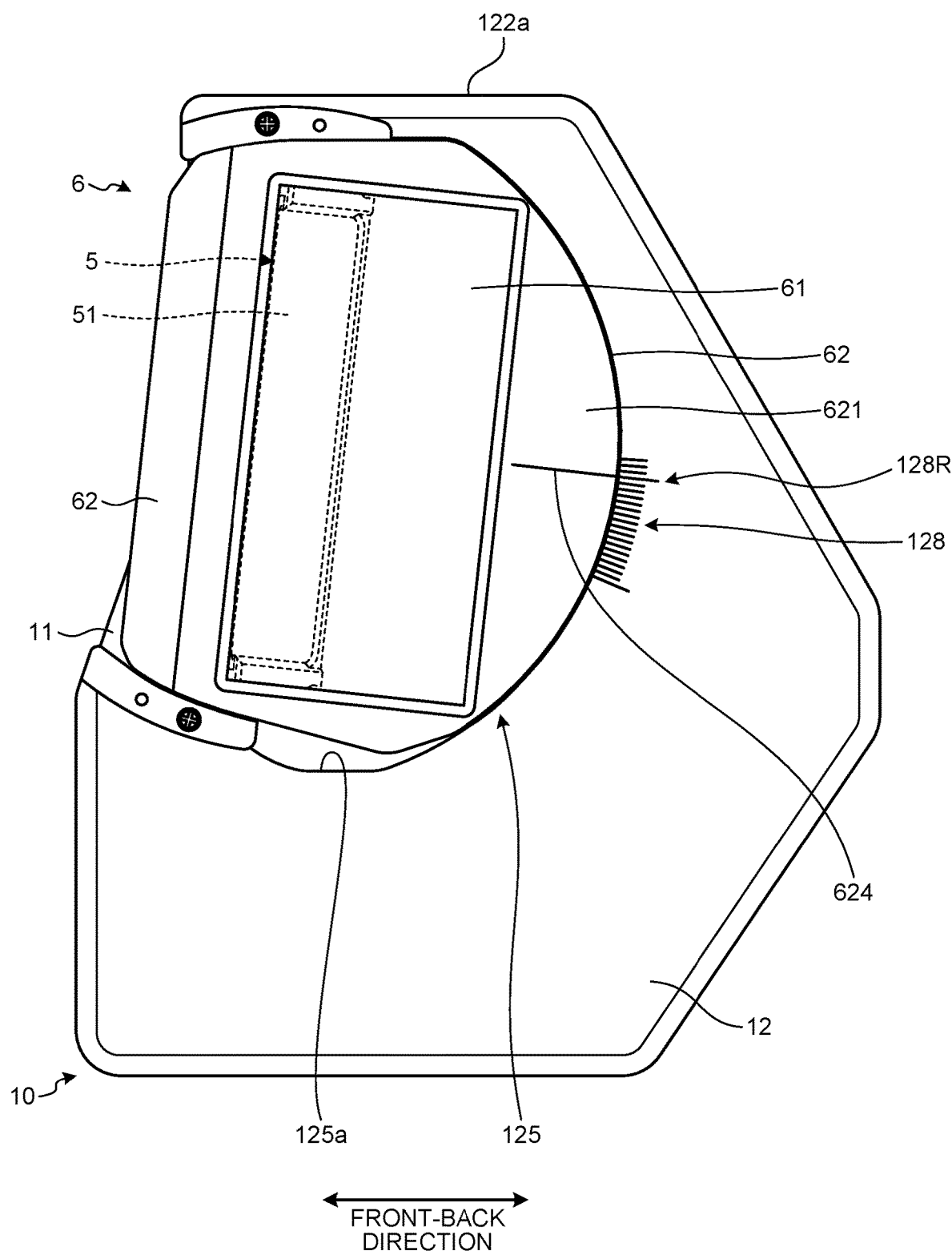
FIG. 10 is a diagram illustrating a state in which the head-up display device according to the first embodiment is mounted for the driver on the vehicle with the right-hand steering wheel.

With reference to FIG. 7 and FIG. 10, a method of installing the HUD device 1 for the driver $D_R$ in the vehicle with the right-hand steering wheel will be described. FIG. 10 is a diagram illustrating a state in which the head-up display device according to the first embodiment is mounted for the driver on the vehicle with the right-hand steering wheel. In FIG. 7, solid lines indicate the concave mirror unit 5 and the cover unit 6 of the HUD device 1 installed for the driver $D_R$ in the vehicle with the right-hand steering wheel.

Adjustment of the mounting posture of the housing 10 in the vehicle will be described. In the first embodiment, the housing 10 is mounted on the dashboard in front of the driver $D_R$ in the vehicle with the right-hand steering wheel such that the wall portion 111 of the housing 10 becomes parallel to the vehicle horizontal plane and a position adjustment reference plane 122a of the wall portion 122 of the housing 10 becomes parallel to the front-back direction of the vehicle.

Adjustment of the posture of the concave mirror unit 5 with respect to the housing 10 will be described. The concave mirror unit 5 is rotated with respect to the housing 10 such that the reference line 624 of the cover unit 6 indicates scales 128R. Then, the concave mirror unit 5 and the housing 10 are fastened together with male screws in a state in which the pair of flange portions 534 are overlapped on the pair of support portions 117 and the female screw portions 118R and the long holes 535 are overlapped with each other.

The cover unit 6 is located at a position adjusted for the posture of the concave mirror unit 5 with respect to the housing 10.

Figure 11:
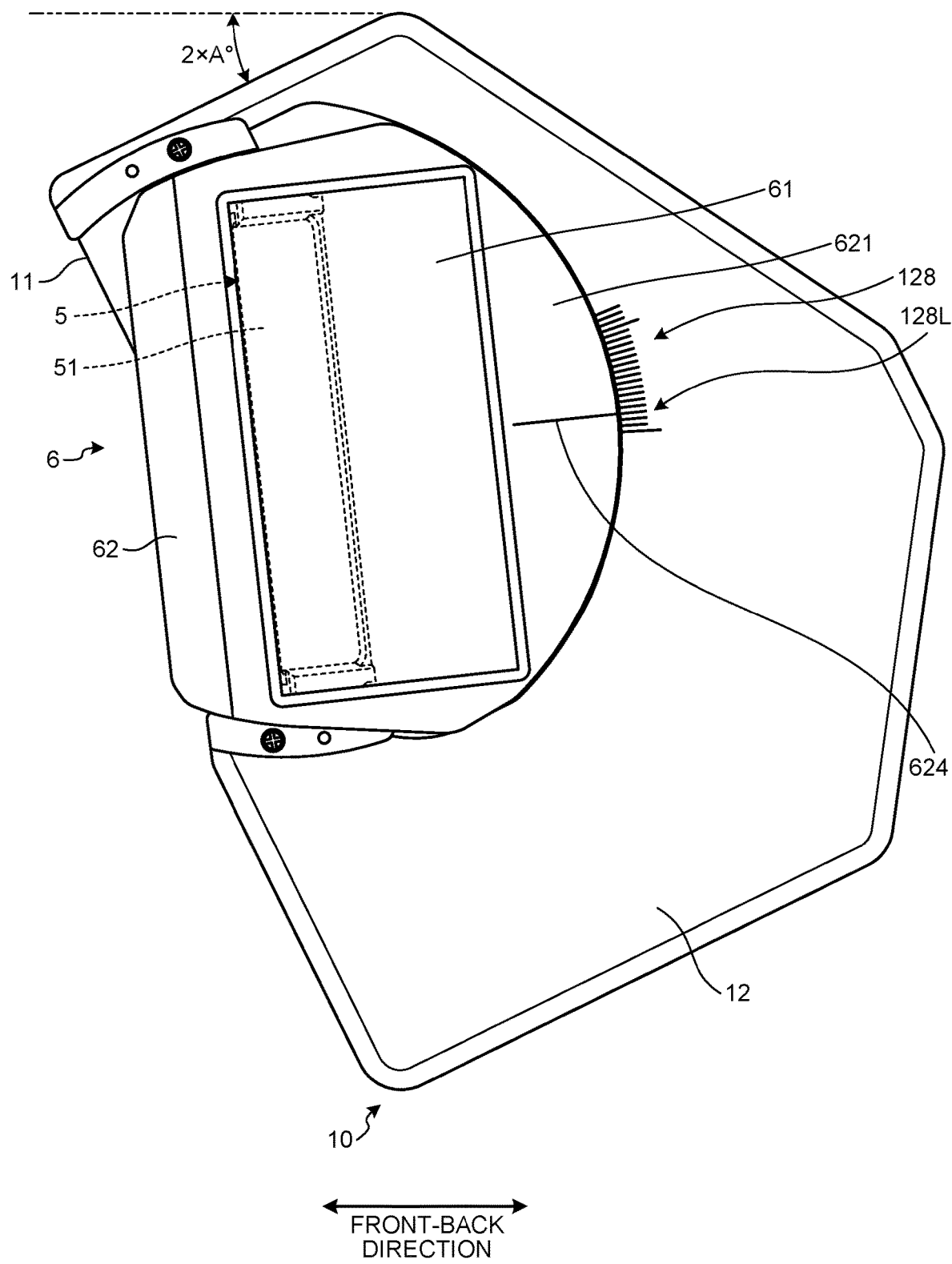
FIG. 11 is a diagram illustrating a state in which the head-up display device according to the first embodiment is mounted for the driver on the vehicle with the left-hand steering wheel.

With reference to FIG. 7 and FIG. 11, a method of installing the HUD device 1 for the driver $D_L$ in the vehicle with the left-hand steering wheel will be described. FIG. 11 is a diagram illustrating a state in which the head-up display device according to the first embodiment is mounted for the driver on the vehicle with the left-hand steering wheel. In FIG. 7, dashed lines indicate the concave mirror unit 5 and the cover unit 6 of the HUD device 1 that is installed for the driver $D_L$ in the vehicle with the left-hand steering wheel.

Adjustment of the mounting posture of the housing 10 in the vehicle will be described. In the first embodiment, the housing 10 is mounted on the dashboard in front of the driver $D_L$ in the vehicle with the left-hand steering wheel such that the wall portion 111 of the housing 10 becomes parallel to the vehicle horizontal plane and the position adjustment reference plane 122a of the wall portion 122 of the housing 10 is rotated by $2 \times A°$ in the counterclockwise direction from the posture in which the housing 10 is installed for the driver $D_R$.

Adjustment of the posture of the concave mirror unit 5 with respect to the housing 10 will be described. The concave mirror unit 5 is rotated by the angle of $2 \times B°$ with respect to the housing 10 such that the reference line 624 of the cover unit 6 indicates scales 128L. Then, the concave mirror unit 5 and the housing 10 are fastened together with male screws in a state in which the pair of flange portions 534 are overlapped on the pair of support portions 117 and the female screw portions 118L and the long holes 535 are overlapped with each other.

The cover unit 6 is located at a position adjusted for the posture of the concave mirror unit 5 with respect to the housing 10.

As described above, the mounting posture of the housing 10 of the HUD device 1 with respect to the vehicle and the posture of the concave mirror unit 5 with respect to the housing 10 are adjusted both in the case of installation for the driver $D_R$ in the vehicle with the right-hand steering wheel and in the case of installation for the driver $D_L$ in the vehicle with the left-hand steering wheel. With this configuration, it is possible to allow both of the drivers D in the vehicle with the right-hand steering wheel and in the vehicle with the left-hand steering wheel to view appropriate virtual images.

As described above, in the first embodiment, each of the mounting posture of the housing 10 with respect to the vehicle and the posture of the concave mirror unit 5 with respect to the housing 10 are adjusted both in the case of installation for the driver $D_R$ in the vehicle with the right-hand steering wheel and in the case of installation for the driver $D_L$ in the vehicle with the left-hand steering wheel. According to the first embodiment, it is possible to realize installation using the single HUD device 1 such that both of the drivers D in the vehicle with the right-hand steering wheel and in the vehicle with the left-hand steering wheel can view appropriate virtual images. As described above, according to the first embodiment, it is possible to share a large number of components in the case of installation for the driver $D_R$ in the vehicle with the right-hand steering wheel and in the case of installation for the driver $D_L$ in the vehicle with the left-hand steering wheel.

In the first embodiment, it is possible to fix the concave mirror unit 5 on the housing 10 in a state in which the concave mirror unit 5 is rotated and positioned with respect to the housing 10, by fastening the female screw portions 118 and the long holes 535 in an overlapping manner. Furthermore, according to the first embodiment, by adjusting positions at which the female screw portions 118 and the long holes 535 overlap with each other, it is possible to appropriately install the single HUD device 1 in vehicles with the right-hand steering wheel and vehicles with the left-hand steering wheel of various vehicle types. In the first embodiment, the first reflecting mirror 3 and the second reflecting mirror 4 are arranged between the display 2 and the concave mirror 51, and the ray path is folded inside the housing 10. With this configuration, in the first embodiment, it is possible to reduce a size of the housing 10, so that the size of the housing 10 can be set to a mountable size in the vehicle.

In the first embodiment, the cover unit 6 rotates with respect to the housing 10 in conjunction with the rotation of the concave mirror unit 5 with respect to the housing 10. With this configuration, in the first embodiment, when the HUD device 1 is shared by the vehicle with the right-hand steering wheel and the vehicle with the left-hand steering wheel, it is possible to locate the transmission part 61 in a portion that is needed for transmitting the video display light, in accordance with the posture of the concave mirror unit 5. According to the first embodiment, it is possible to reduce a size of the transmission part 61.

Figure 16:
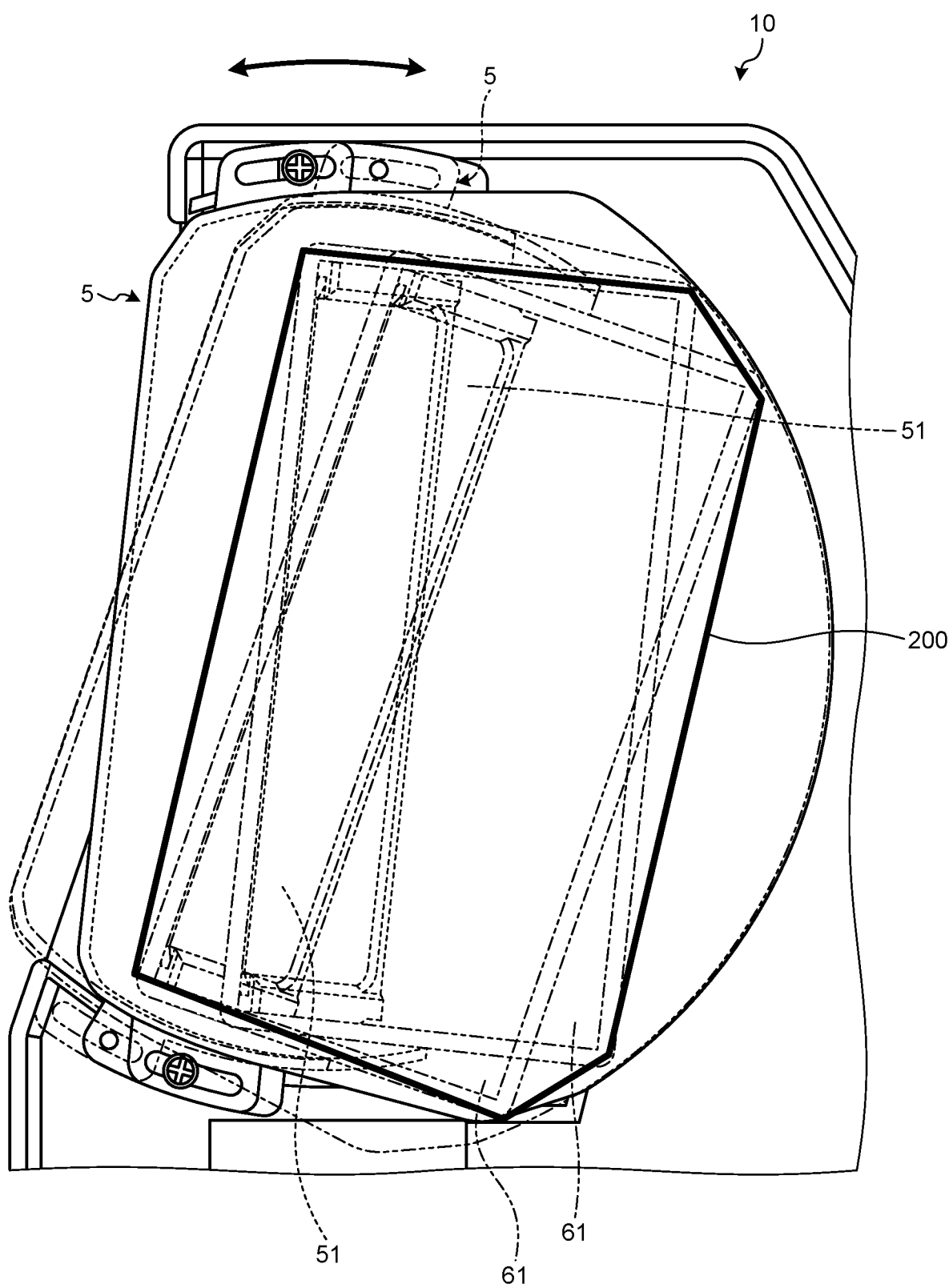
FIG. 16 is a plan view of a concave mirror unit and a transmission part in a head-up display device in which a transmission part does not rotate in a linked manner with the concave mirror.

In contrast, as illustrated in FIG. 16, a case will be described in which a transmission part 200 that does not rotate in conjunction with the rotation of the concave mirror unit 5 is installed. FIG. 16 is a plan view of a concave mirror unit and a transmission part in a head-up display device in which the transmission part does not rotate in a linked manner with the concave mirror unit 5. A ray path projected from the concave mirror 51 to the windshield S is largely different between the case of installation in the vehicle with the right-hand steering wheel and the case of installation in the vehicle with the left-hand steering wheel because the concave mirror unit 5 is rotated with respect to the housing 10. Therefore, when the HUD device 1 is shared by the vehicle with the right-hand steering wheel and the vehicle with the left-hand steering wheel, it is necessary to increase a size of the transmission part 200.

In the first embodiment, the driving unit 52 is arranged on the opposite side of the reflecting surface of the concave mirror 51. With this configuration, in the first embodiment, the driving unit 52 is not located on the ray path projected from the concave mirror 51 when the concave mirror unit 5 is rotated, so that it is possible to reduce sizes of the concave mirror 51 and the concave mirror unit 5. In the first embodiment, by reducing the size of the concave mirror unit 5, it is possible to increase degree of freedom of arrangement of other optical members in the housing 10.

In the first embodiment, outer shapes of the curved portions 532a of the wall portion 532 of the concave mirror unit 5 is circular arcs, and the inner wall portions 114 of the housing 10 are formed in circular arc shapes corresponding to the curved portions 532a. Therefore, in the first embodiment, it is possible to prevent the video display light of the display 2 from leaking from a joint between the housing 10 and the concave mirror unit 5 when the concave mirror unit 5 is rotated.

In the first embodiment, the convex portion 116, which serves as a rotation center when the concave mirror unit 5 rotates with respect to the housing 10, is arranged on the housing 10 side, and the hole portion 537 that can be fitted to the convex portion 116 is formed on the concave mirror unit 5 side. According to the first embodiment, it is possible to precisely adjust the angle of the concave mirror unit 5 on the vehicle horizontal plane.

In the first embodiment, it is possible to appropriately and easily set the angle of the concave mirror unit 5 by the scales 128 and the reference line 624, in accordance with the type of the vehicle, the vehicle with the right-hand steering wheel, and the vehicle with the left-hand steering wheel.

Second Embodiment

Figure 12:
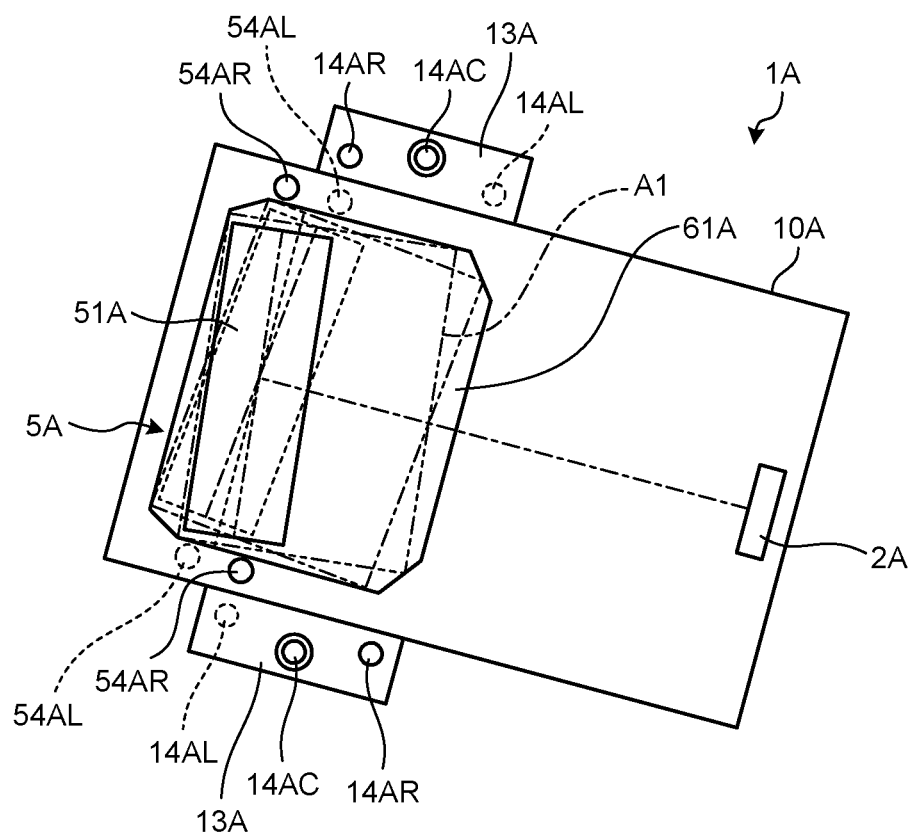
FIG. 12 is a diagram illustrating a state in which a head-up display device according to a second embodiment is mounted for the driver on the vehicle with the right-hand steering wheel.
Figure 13:
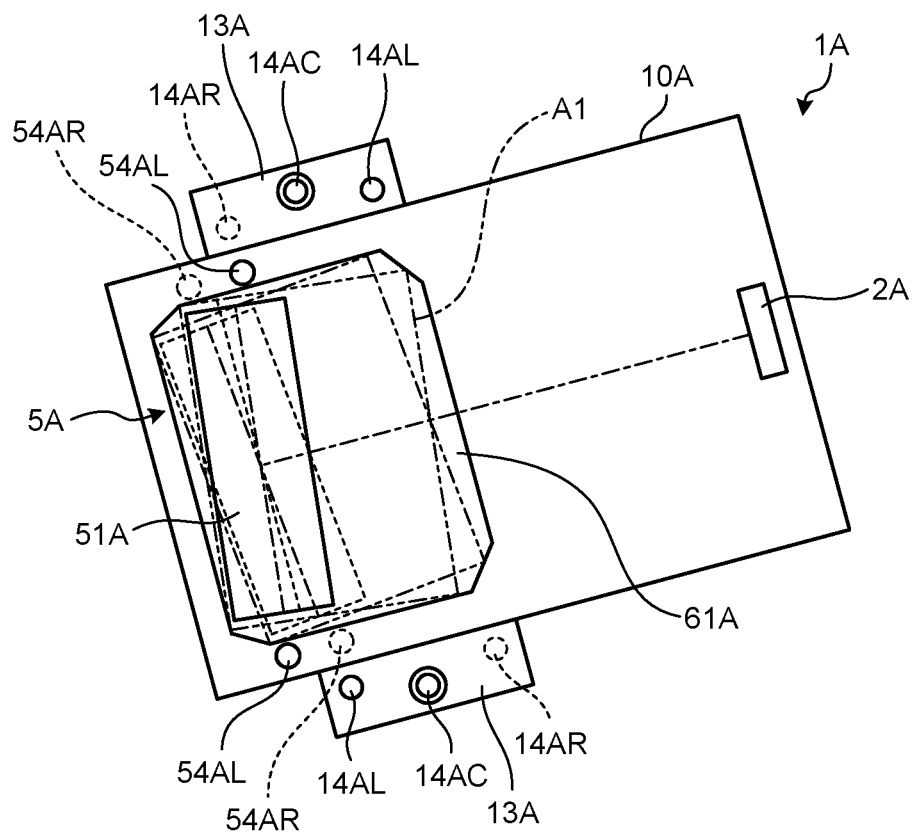
FIG. 13 is a diagram illustrating a state in which the head-up display device according to the second embodiment is mounted for the driver on the vehicle with the left-hand steering wheel.

With reference to FIG. 12 and FIG. 13, a HUD device 1A will be described. FIG. 12 is a diagram illustrating a state in which a head-up display device according to a second embodiment is mounted for a driver on a vehicle with a right-hand steering wheel. FIG. 13 is a diagram illustrating a state in which the head-up display device according to the second embodiment is mounted for a driver on a vehicle with a left-hand steering wheel. In FIG. 12 and FIG. 13, for simplicity of explanation, some members are omitted in the illustration. A basic configuration of the HUD device 1A is the same as the HUD device 1 of the first embodiment. In the following description, the same components as those of the HUD device 1 are denoted by the same or corresponding reference symbols, and detailed explanation thereof will be omitted.

In the second embodiment, it is assumed that the HUD device 1A is mounted on a vehicle with a right-hand steering wheel and a vehicle with a left-hand steering wheel of a specific vehicle type. Therefore, it is sufficient to set the angle A and the angle B so as to be applied with the specific vehicle type.

In the second embodiment, for simplicity of explanation, it is assumed that the HUD device 1A does not include reflecting mirrors. For example, the HUD device 1A includes a display 2A, a concave mirror unit 5A, a transmission part 61A, and a housing 10A.

On the housing 10A, female screw portions 14A are formed on flange portions 13A that are formed on a pair of side walls that face each other. The female screw portions 14A are screwed together with male screws that fasten the housing 10A and a mounted portion. In the second embodiment, each of the female screw portions 14A includes a female screw portion 14AR, a female screw portion 14AC, and a female screw portion 14AL that are formed on each of the flange portions 13A.

When the HUD device 1A is mounted on the vehicle with the right-hand steering wheel of the specific vehicle type, the female screw portions 14AR, the female screw portions 14AC, and the mounted portion of the vehicle are fastened together. When the HUD device 1A is mounted on the vehicle with the left-hand steering wheel of the specific type, the female screw portions 14AL, the female screw portions 14AC, and the mounted portion of the vehicle are fastened together. With use of the female screw portions 14A, the posture of the HUD device 1A is adjusted so as to be rotated by the angle of 2×A° on a plane parallel to the vehicle horizontal plane between the case for installation for the driver $D_R$ and the case for installation for the driver $D_l$.

The concave mirror unit 5A includes a concave mirror 51A and female screw portions 54A. An angle of the concave mirror 51A with respect to the housing 10A is adjustable in the concave mirror unit 5A. A female screw portion 54AR and a female screw portion 54AL are arranged on each of the female screw portions 54A.

When the HUD device 1A is mounted on the vehicle with the right-hand steering wheel of the specific type, the female screw portions 54AR and the mounted portion of the housing 10A are fastened together. When the HUD device 1A is mounted on the vehicle with the left-hand steering wheel of the specific type, the female screw portions 54AL and the mounted portion of the housing 10A are fastened together. With use of the female screw portions 54A, a posture of the concave mirror 51A is adjusted so as to be rotated by an angle of 2×B° on a plane parallel to the vehicle horizontal plane between the case of installation for the driver $D_L$ and the case of installation for the driver $D_R$.

The transmission part 61A is set in a certain shape that does not block a ray projected from the concave mirror 51A to the windshield S even when the HUD device 1A is mounted on the vehicle with the right-hand steering wheel or the vehicle with the left-hand steering wheel.

As described above, in the second embodiment, in the case of mounting on a vehicle of a specific type, it is possible to easily adjust the mounting posture of the housing 10A with respect to the vehicle by using the female screw portions 14A both in the case of installation for the driver $D_L$ and in the case of installation for the driver $D_R$. In the second embodiment, in the case of mounting on the vehicle of the specific type, it is possible to easily adjust the mounting posture of the concave mirror unit 5 with respect to the housing 10 by using the female screw portions 54A both in the case of installation for the driver $D_L$ and in the case of installation for the driver $D_R$.

In this manner, according to the second embodiment, in the case of mounting on the vehicle of the specific type, by forming the female screw portions 14A and the female screw portions 54A on the single HUD device 1, it is possible to share a large number of components both in the case of installation for the driver $D_R$ in the vehicle with the right-hand steering wheel and in the case of installation for the driver $D_L$ in the vehicle with the left-hand steering wheel.

Third Embodiment

Figure 14:
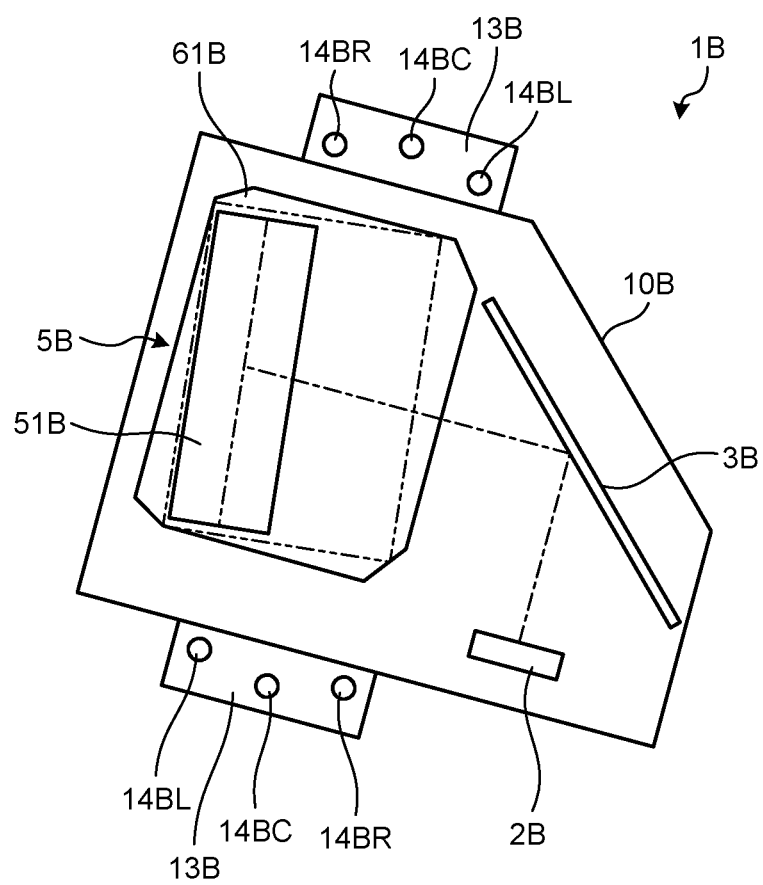
FIG. 14 is a diagram illustrating a state in which a head-up display device according to a third embodiment is mounted for the driver on the vehicle with the right-hand steering wheel.
Figure 15:
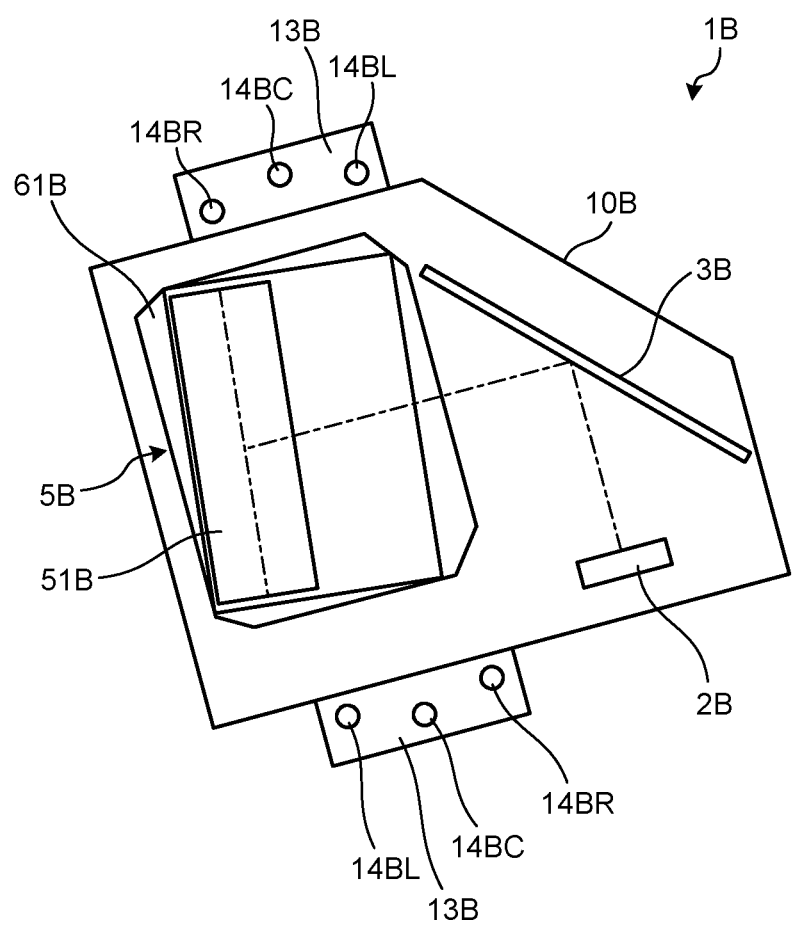
FIG. 15 is a diagram illustrating a state in which the head-up display device according to the third embodiment is mounted for the driver on the vehicle with the left-hand steering wheel.

With reference to FIG. 14 and FIG. 15, a HUD device 1B will be described. FIG. 14 is a diagram illustrating a state in which a head-up display device according to a third embodiment is mounted a driver on a vehicle with a right-hand steering wheel. FIG. 15 is a diagram illustrating a state in which the head-up display device according to the third embodiment is mounted for a driver on a vehicle with a left-hand steering wheel. A basic configuration of the HUD device 1B is the same as the HUD device 1 of the first embodiment and the HUD device 1A of the second embodiment. The HUD device 1B is obtained by reducing the size of the HUD device 1A of the second embodiment. More specifically, the HUD device 1B is different from the first embodiment and the second embodiment in that the HUD device 1B includes a single reflecting mirror.

The HUD device 1B includes a display 2B, a reflecting mirror 3B, a concave mirror unit 5B, a transmission part 61B, and a housing 10B.

The display 2B, the reflecting mirror 3B, and the concave mirror unit 5B are assembled in an inner space of the housing 10B. In the housing 10B, female screw portions 14B are formed on flange portions 13B that are formed on a pair of side wall portions that face each other.

A display surface of the display 2B faces a reflecting surface of the reflecting mirror 3B.

The reflecting surface of the reflecting mirror 3B faces the display surface of the display 2B and a reflecting surface of a concave mirror 51B. The reflecting mirror 3B reflects a video display light that has entered from the display 2B toward the concave mirror 51B. With use of the reflecting mirror 3B, it is possible to reduce the size of the HUD device 1B.

The reflecting surface of the concave mirror 51B faces the reflecting surface of the reflecting mirror 3B and a reflecting surface of the windshield S. The concave mirror 51B reflects the video display light that has entered from the reflecting mirror 3B toward the windshield S.

As described above, in the third embodiment, with use of the single reflecting mirror 3B, it is possible to reduce the size of the housing 10B. In this manner, according to the third embodiment, even in the HUD device 1B with the reduced size, it is possible to share a large number of components both in the case of installation for the driver $D_R$ in the vehicle with the right-hand steering wheel and in the case of installation for the driver $D_L$ in the vehicle with the left-hand steering wheel.

While the HUD device 1 according to the present application has been described above, the present application may be embodied in various different forms other than the above-described embodiments.

In the explanation described above, it is assumed that the HUD device 1 includes the first reflecting mirror 3 and the second reflecting mirror 4, but embodiments are not limited to this example. It is satisfactory that the HUD device 1 includes at least the display 2, the concave mirror unit 5, and the housing 10 arranged in the vehicle. The HUD device 1 may further include one or more reflecting mirrors.

While it is explained that the optical members are two-dimensionally arranged in the same plane, embodiments are not limited to this example. The optical members may be three-dimensionally arranged at different heights in the vertical direction with respect to the vehicle horizontal plane.

While it is explained that the female screw portions 118 include the female screw portions 118R and the female screw portions 118L, embodiments are not limited to this example. It may be possible to use the housing 10 including only the female screw portion 118R when the HUD device 1 is installed in the vehicle with the right-hand steering wheel, and use the housing 10 including only the female screw portion 118L when the HUD device 1 is installed in the vehicle with the left-hand steering wheel. With this configuration, it is possible to more easily perform positioning.

While it is explained that the frame portion 621 is in the form of a plane, embodiments are not limited to this example. The frame portion 621 may be formed in an inclined shape or a curved shape for a measure against reflection light by the transmission part 61.

According to the present application, it is possible to share a large number of members.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
  a display configured to display a video;

a concave mirror configured to reflect a video display light of the video displayed on the display toward a reflection part that is formed in a curved shape and that faces a viewer;

a housing in which the display and the concave mirror are assembled; and a transmission part that is formed in a rectangular shape and arranged above the concave mirror and transmits the video display light that is reflected by the concave mirror and travels toward the reflection part, wherein the housing is arranged such that a mounting posture of the housing with respect to a mounted portion is adjustable both in a case in which the viewer is located at a first position which is a driver seat in a vehicle with a right-hand steering wheel and in a case in which the viewer is located at a second position which is a driver seat in a vehicle with a left-hand steering wheel, the concave mirror is arranged such that an angle of the concave mirror with respect to the housing is adjustable by rotating the concave mirror on a reference plane of the housing in accordance with a relative positional relationship among the housing, the reflection part, and the viewer both in the case in which the viewer is located at the first position and in the case in which the viewer is located at the second position, wherein the housing comprises a first positioning portion that is formed integrally with the housing and is capable of determining a position of the concave mirror at a position by rotating the concave mirror by a second angle on the reference plane of the housing, the second angle being twice an angle between a normal line of a first central ray on the reference plane and a central line of the concave mirror on the reference plane, both in a case in which the viewer is located at the first position and in the case in which the viewer is located at the second position, and a casing that accommodates the concave mirror comprises a second positioning portion that is formed integrally with the casing so as to correspond to the first positioning portion and that is capable of adjusting an angle of the concave mirror with respect to the housing by rotating a position of the first positioning portion and a position of the second positioning portion, both in the case in which the viewer is located at the first position and in the case in which the viewer is located at the second position, and the transmission part rotates in conjunction with rotation of the casing in a portion that is needed for transmitting the video display light.

2. The display device according to claim 1, wherein the mounting posture of the housing with respect to the mounted portion is adjustable by rotating the housing on the reference plane in accordance with the relative positional relationship among the housing, the reflection part, and the viewer.

3. The display device according to claim 2, wherein the housing is arranged such that the mounting posture of the housing is adjustable to a posture by rotating the housing by a first angle with respect to the mounted portion, the first angle being twice an angle between a first central ray of the video display light of the video displayed on the display and a second central ray that is reflected by the reflection part and reaches the viewer, both in a case in which the viewer is located at the first position and in a case in which the viewer is located at the second position, and the concave mirror is arranged such that an angle of the concave mirror is adjustable by rotating the concave mirror by a second angle on the reference plane of the housing, the second angle being twice an angle between the normal line of the first central ray on the reference plane and the central line of the concave mirror on the reference plane, both in the case in which the viewer is located at the first position and in the case in which the viewer is located at the second position.

4. The display device according to claim 1, wherein the first positioning portion includes a female screw portion for the first position which is used in a case in which the viewer is located at the first position and a female screw portion for the first position which is used in a case in which the viewer is located at the second position, the second positioning portion is a long hole formed in a circular arc shape corresponding to a rotation direction of the housing in the reference plane, in a case in which the viewer is located at the first position, the female screw portion for the first position and the long hole are fastened together with a fastening member such that the female screw portion and the long hole overlap with each other, and in a case in which the viewer is located at the second position, the female screw portion for the second position and the long hole are fastened together with a fastening member such that the female screw portion and the long hole overlap with each other.

5. The display device according to claim 4, wherein the second positioning portion is formed in a long hole shape that extends along a rotation direction of the concave mirror with respect to the housing.

6. A method of installing a display device including:

a display configured to display a video;

a concave mirror configured to reflect a video display light of the video displayed on the display toward a reflection part that is formed in a curved shape and that faces a viewer;

a housing in which the display and the concave mirror are assembled; and a transmission part that is formed in a rectangular shape and arranged above the concave mirror and transmits the video display light that is reflected by the concave mirror and travels toward the reflection part, the method comprising:

adjusting a mounting posture of the housing to a posture by rotating the housing by a first angle with respect to a mounted portion, the first angle being twice an angle between a first central ray of the video display light of the video displayed on the display and a second central ray that is reflected by the reflection part and reaches the viewer, both in a case in which the viewer is located at a first position which is a driver seat in a vehicle with a right-hand steering wheel and in which the viewer faces the reflection part that is formed in the curved shape with a symmetric curvature with respect to a symmetric surface, and in a case in which the viewer is located at a second position which is a driver seat in a vehicle with the left-hand steering wheel, adjusting an angle of the concave mirror by rotating the concave mirror by a second angle with reference to a reference plane of the housing, the second angle being twice an angle between a normal line of the first central ray on the reference plane of the housing and a central line of the concave mirror on the reference plane both in the case in which the viewer is located at the first position and in the case in which the viewer is located at the second position, wherein the housing comprises a first positioning portion that is formed integrally with the housing and that is capable of determining a position of the concave mirror at a position by rotating the concave mirror by the second angle on the reference plane of the housing, the second angle being twice the angle between the normal line of the first central ray on the reference plane and the central line of the concave mirror on the reference plane, both in the case in which the viewer is located at the first position and in the case in which the viewer is located at the second position, and a casing that accommodates the concave mirror comprises a second positioning portion that is formed integrally with the casing so as to correspond to the first positioning portion and that is capable of adjusting an angle of the concave mirror with respect to the housing by rotating a position of the first positioning portion and a position of the second positioning portion, both in the case in which the viewer is located at the first position and in the case in which the viewer is located at the second position, and rotating the transmission part in conjunction with rotation of the casing in a portion that is needed for transmitting the video display light.

* * * * *